R. O. WATSON.
PISTON PIN LOCK.
APPLICATION FILED MAY 20, 1919.

1,381,260.

Patented June 14, 1921.

INVENTOR
Ralph O. Watson
BY
Dempster M. Smith
ATTORNEY

UNITED STATES PATENT OFFICE.

RALPH O. WATSON, OF JERSEY CITY, NEW JERSEY.

PISTON-PIN LOCK.

1,381,260.

Specification of Letters Patent.   Patented June 14, 1921.

Application filed May 20, 1919. Serial No. 298,522.

*To all whom it may concern:*

Be it known that I, RALPH O. WATSON, a citizen of the United States, residing at Jersey City, in the State of New Jersey, have invented certain new and useful Improvements in Piston-Pin Locks, fully described and represented in the following specification and the accompanying drawing, forming a part of the same.

A principal object of my invention is to provide very simple and secure means for retaining the piston pin in proper position in a piston. Another object is to provide locking means which are equally effective with a piston pin which is free to rotate in the piston or is secured therein against rotation. A further object is to provide a locking device which is located inwardly from the outer piston surface, and therefore cannot engage the cylinder wall; which retains the pin in such a way that the ends of the pin cannot touch the cylinder wall, and which is self-retained in position in the piston.

The accompanying drawing shows an exemplifying embodiment of the invention.

Figure 1:
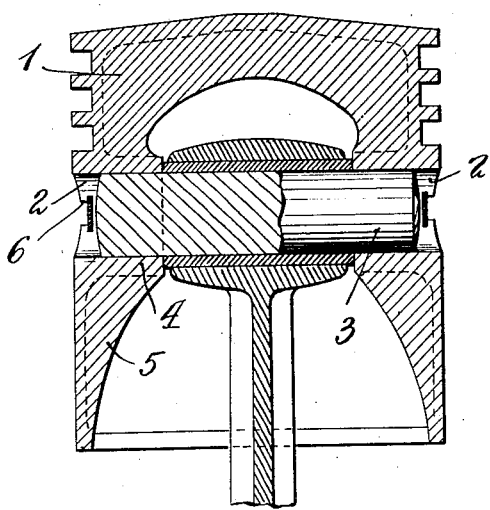
Figure 1 is a vertical section of a structure embodying the invention, in the plane of the axis of the pin.
Figure 2:
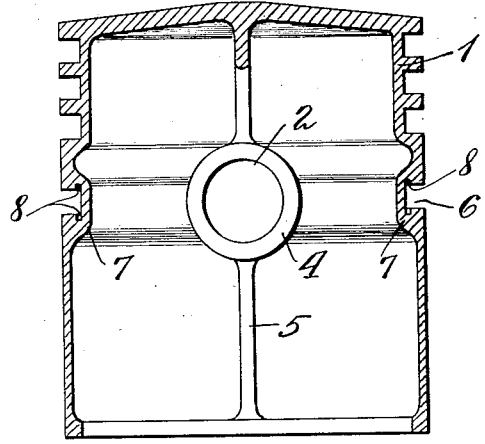
Fig. 2 is a vertical section in a plane at a right angle to that of Fig. 1.

The reference character 1 designates a trunk piston having the usual holes 2 in opposite side walls to receive the pin 3. The material of the piston is extended inwardly as usual to provide sleeves 4 supported by webs 5, so that the pin has ample area of contact with the piston. An annular groove 6 is formed in the piston wall, and for the proper accommodation of this groove the wall is preferably provided with an annular inner enlargement 7. At a reasonable distance inwardly from the outer surface of the piston at least one undercut groove 8 is formed extending at a right angle to the direction of groove 6, and usually there are two of these undercut grooves as shown. Grooves 6 and 8 intersect the outer ends of the piston pin holes 2. After the pin is put in position, the locking ring 9, which is split at 10, is inserted in the undercut grooves 8, and when so inserted, lies outside the ends of the pin and positively prevents the pin from coming in contact with the walls of the cylinder and is self-retained in position out of contact with the cylinder walls.

Figure 3:
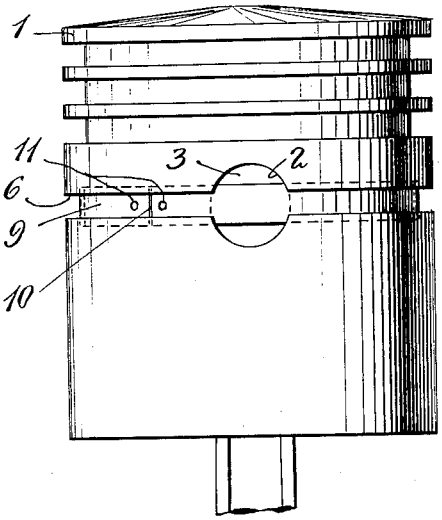
Fig. 3 is a side elevation looking toward the end of the pin.
Figure 4:
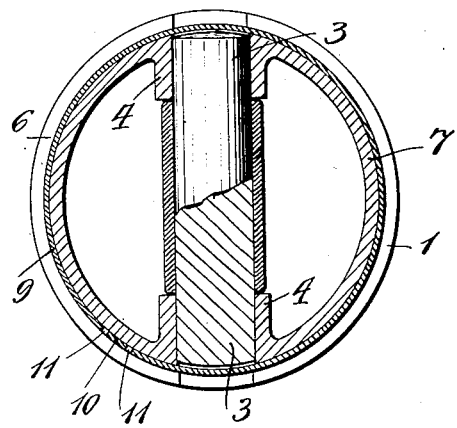
Fig. 4 is a horizontal section in the plane of the pin axis.

The locking ring is easily inserted by pulling it open somewhat, passing it over the end of the piston and bringing it down opposite the groove 6 and then inserting one of its ends into the outer end of one of the pin holes 2 and into the ends of undercut grooves 8 where they enter the hole; then pushing the end of the ring around through the undercut grooves until the other end of the ring snaps into the pin aperture; and then if desired the ring may be rotated still farther until it assumes such a position as shown in Fig. 3, in which the split 10 is out of registry with the pin apertures.

It is usually desirable to provide means such as holes 11 near the ends of the locking ring by which a tool may be easily used to insert or remove the ring.

It will be noted that this locking device does not affect in any way the normal oiling of the cylinder wall or of the piston pin, nor does it affect the wiping of the cylinder walls by rings or other devices which may be employed for that purpose in accordance with the standard practice. The invention is also equally adapted to an arrangement in which the pin 3 is free to turn in the sleeves 4, or one in which the pin is made with such a close fit that it will not turn in the piston.

The engagement of the edges of the locking ring with the undercut grooves 8 positively prevents the ring from being extended by endwise movement of the piston pin, or from any other cause. In some cases it will be evident that a single undercut groove extending from one side of the bottom of groove 6 will be sufficient for this purpose.

What is claimed is:

1. A piston structure, comprising in combination with a piston having a transverse opening and a piston pin in said opening, a retaining ring passing about the piston opposite the ends of the pin and having its outer surface located inwardly from the outer piston surface, and positive means holding the retaining ring in position away from contact with the cylinder wall.

2. In a piston structure, the combination with a piston having transverse holes in two opposite sides and a piston pin located in the holes, of locking means comprising a split ring encircling the piston and intersecting said holes at points substantially opposite the ends of the pin, said ring being secured in a vertically undercut portion of a groove surrounding the piston, said undercut portion being located inwardly from the outer surface of the piston.

3. In a piston construction, the combination of a piston having in opposite sides holes to receive the piston pin, and having a groove intersecting the outer portions of said holes, the groove being provided with vertically undercut extensions located considerably inwardly from the outer surface of the piston, a piston pin located in said holes, and a divided locking ring located in the undercut portions of said groove, the ring having near its divided portion means adapted to be engaged by a tool for manipulating the ring.

4. In a piston construction, the combination of a piston having in opposite sides holes to receive the piston pin, and having a groove intersecting the outer portions of said holes, the groove being provided with vertically undercut extensions located considerably inwardly from the outer surface of the piston, a piston pin located in said holes, and a divided locking ring located in the undercut portions of said groove, the ring having near one of its ends a hole to receive a tool for manipulating the ring.

5. In a piston construction, the combination of a piston having in opposite sides holes to receive the piston pin, and having a groove intersecting the outer portions of said holes, the groove being provided with vertically undercut extensions located considerably inwardly from the outer surface of the piston, a piston pin located in said holes, and a divided locking ring located in the undercut portions of said groove, the ring having near its ends holes to receive a tool for manipulating the ring.

6. In a piston construction, the combination of a piston having in opposite sides holes to receive the piston pin, and having a groove intersecting the outer portions of said holes, the groove being provided with a vertically undercut extension located considerably inwardly from the outer surface of the piston, a piston pin located in said holes, and a divided locking ring located in the undercut portion of said groove.

In testimony whereof I have hereunto set my hand in the presence of two subscribing witnesses.

RALPH O. WATSON.

Witnesses:
ADELE S. EBERHARDT,
MAISIE MAURUS.